(12) United States Patent
Tu et al.

(10) Patent No.: US 9,432,828 B1
(45) Date of Patent: Aug. 30, 2016

(54) VEHICLE EMERGENCY DIALING SYSTEM

(71) Applicant: GM Global Technology Operations LLC, Detroit, MI (US)

(72) Inventors: Thomas H. Tu, Troy, MI (US); Thomas J. Stacey, Commerce Township, MI (US); Daniel R. Saylor, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/816,631

(22) Filed: Aug. 3, 2015

(51) Int. Cl.
| | |
|---|---|
| *H04M 11/04* | (2006.01) |
| *H04W 4/22* | (2009.01) |
| *H04W 76/00* | (2009.01) |
| *H04L 29/08* | (2006.01) |
| *H04W 4/00* | (2009.01) |
| *H04M 1/725* | (2006.01) |
| *H04M 1/73* | (2006.01) |
| *H04W 52/02* | (2009.01) |
| *H04W 84/12* | (2009.01) |

(52) U.S. Cl.
CPC ............. *H04W 4/22* (2013.01); *H04L 67/12* (2013.01); *H04M 1/72536* (2013.01); *H04M 1/73* (2013.01); *H04W 4/008* (2013.01); *H04W 52/0261* (2013.01); *H04W 76/007* (2013.01); *H04W 84/12* (2013.01)

(58) Field of Classification Search
CPC ..... H04W 4/22; H04W 4/008; H04W 84/12; H04W 76/007; H04W 52/0261; H04M 1/73; H04M 1/72536

USPC ............................................. 455/404.1, 404.2
See application file for complete search history.

(56) References Cited

U.S. PATENT DOCUMENTS

| | | | | |
|---|---|---|---|---|
| 7,006,845 | B2 | 2/2006 | Simon | |
| 7,171,226 | B2* | 1/2007 | Crocker | H04W 76/028 455/404.1 |
| 7,778,774 | B2* | 8/2010 | Li | G01C 21/00 701/484 |
| 7,991,381 | B1* | 8/2011 | Dunne | B60R 25/00 379/33 |
| 2003/0083079 | A1* | 5/2003 | Clark | G08G 1/096716 455/466 |
| 2005/0167172 | A1* | 8/2005 | Fernandez | B60L 1/00 180/65.8 |
| 2012/0149323 | A1* | 6/2012 | Springs | B60R 25/403 455/404.1 |
| 2012/0269330 | A1* | 10/2012 | Gouvia | G01C 21/3688 379/52 |
| 2013/0084836 | A1* | 4/2013 | Guenkova-Luy | H04L 12/5692 455/414.1 |

* cited by examiner

*Primary Examiner* — Charles Shedrick
(74) *Attorney, Agent, or Firm* — Christopher DeVries; Reising Ethington P.C.

(57) ABSTRACT

A system and method for providing emergency vehicle services is provided. The method includes detecting an emergency condition including a vehicle crash and/or rollover, determining if a vehicle telematics unit is available, and initiating an emergency communication using one or more wireless devices present in the vehicle if the vehicle telematics unit is unavailable.

20 Claims, 2 Drawing Sheets

VEHICLE EMERGENCY DIALING SYSTEM

TECHNICAL FIELD

The present invention relates to vehicle communications, and in particular, to providing emergency services when a vehicle telematics unit is non-functional or otherwise unavailable.

BACKGROUND

Telematics units are now widely in use on vehicles to provide drivers and passengers with various types of wireless assistance services. For example, "roadside assistance" which historically involved a disabled vehicle and a physical visit to the vehicle by a serviceman, can now in many instances be provided remotely via wireless telecommunication with the vehicle through existing cellular network facilities. Thus, a telephone call to a call center can be used to electronically unlock doors where the keys have inadvertently been locked inside. Also, navigation and emergency assistance services can be obtained by voice communication with an advisor at the call center. Monitoring of vehicle operating conditions by the call center is also possible via the telematics device. For example, an air bag deployment event can be automatically reported to the call center where it triggers a return call to the vehicle from a live advisor to determine if emergency services are needed. However, these emergency services are not available if the telematics unit is unavailable or non-functional.

SUMMARY

According to an embodiment of the invention, there is provided a method of providing emergency vehicle services. The method includes detecting an emergency condition including a vehicle crash and/or rollover, determining if a vehicle telematics unit is unavailable, and initiating an emergency communication using one or more wireless devices present in the vehicle if the vehicle telematics unit is unavailable.

According to another aspect of the invention, there is provided another method of providing emergency vehicle services for a vehicle. The method includes receiving notification of an emergency condition including a vehicle crash and/or rollover, comparing a battery power level to a battery threshold if an emergency communication attempt using a vehicle telematics unit fails, and initiating an emergency communication using one or more wireless devices present in the vehicle, wherein the one or more wireless devices are ranked according to a priority, and wherein the emergency communication is initiated sequentially according the priority using the one or more wireless devices if the battery power level is above the battery threshold, and initiating the emergency communication using all of the one or more wireless devices concurrently if the battery power level is below the battery threshold.

According to yet another aspect of the invention, there is provided a system for providing emergency vehicle services. The system includes at least one vehicle system module configured to: detect an emergency condition including a vehicle crash and/or rollover, determine if a vehicle telematics unit is unavailable, and initiate an emergency communication using one or more wireless devices present in the vehicle if the vehicle telematics unit is unavailable.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

Figure 1:
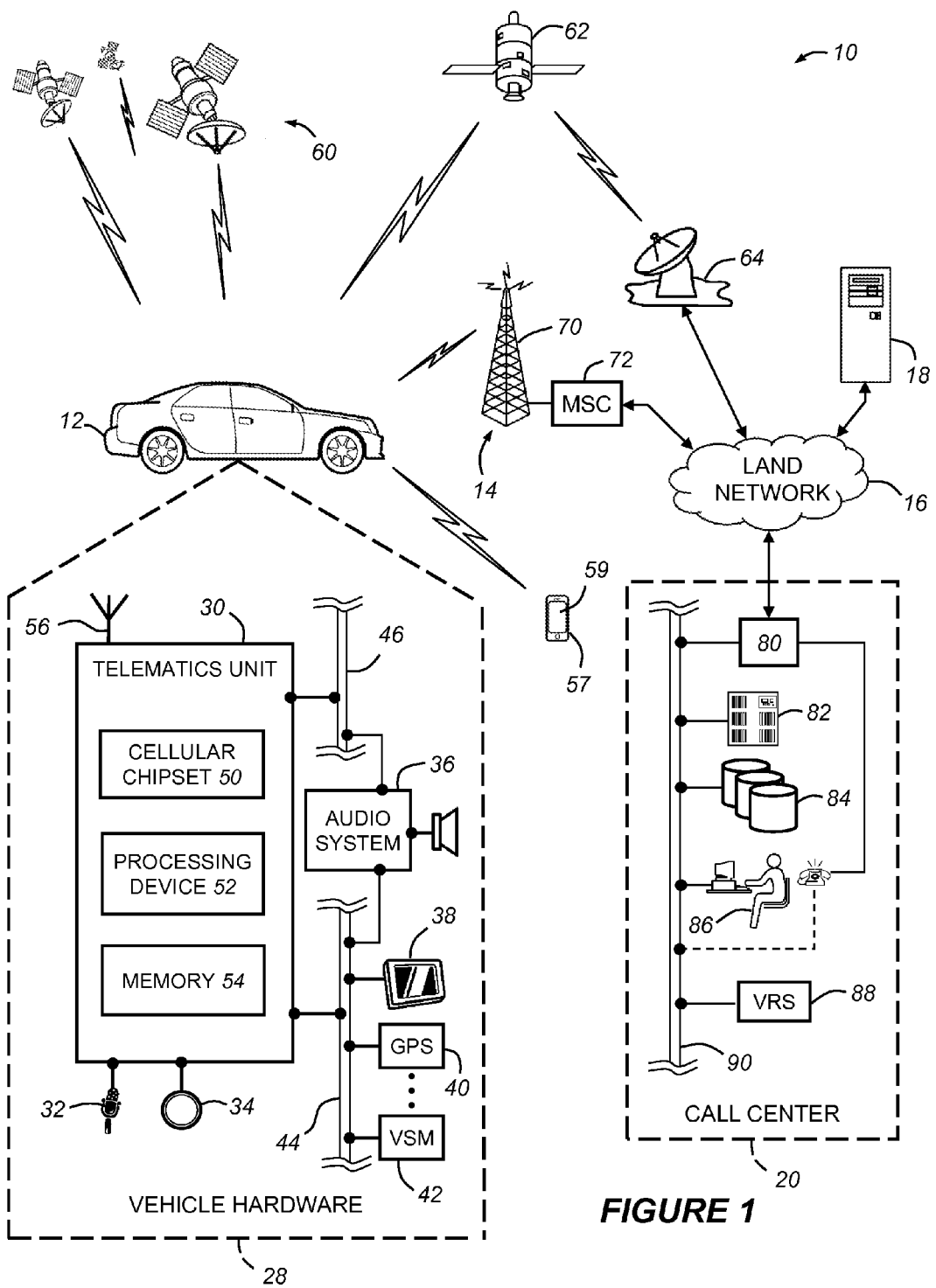
FIG. 1 is a block diagram depicting an embodiment of a communications system that is capable of utilizing the method disclosed herein.

With reference to FIG. 1, there is shown an operating environment that comprises a mobile vehicle communications system 10 that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including trucks, sports utility vehicles (SUVs), recreational vehicles (RVs), marine vessels, aircraft, etc., can also be used. Some of the vehicle electronics 28 are shown generally in FIG. 1 and include a telematics unit 30, a microphone 32, one or more pushbuttons or other control inputs 34, an audio system 36, a visual display 38, a GPS module 40, and a plurality of vehicle system modules (VSMs) 42. Some of these devices can be connected directly to the telematics unit 30 such as, for example, the microphone 32 and pushbutton(s) 34, while others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle 12 to communicate with call center 20, other telematics-enabled vehicles, or some other entity or device. The telematics unit 30 preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle 12 to offer a number of different services including those related to navigation, telephony, emergency assistance, diagnostics, infotainment, etc. Data can be sent either via a data connection, such as packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to any suitable wireless communication platform, such as GSM, CDMA, or LTE and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software stored in the telematics unit 30 and executed by processor 52, or it can be a separate hardware component or module located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit 30 can be configured with a static IP address or can be set up to automatically receive an assigned IP address from another device on the network such as a router or from a network address server.

One of the networked devices that can communicate with the telematics unit 30 is a wireless mobile device, such as a smart phone 57. Examples of the smart phone 57 include the iPhone™ manufactured by Apple, Inc. and the Droid™ manufactured by Motorola, Inc. but others are known. These and other similar devices may be used or considered as a type of separate wireless device for the purposes of the method described herein. While the smart phone 57 is described with the methods below, it should be appreciated that other similar and/or simpler portable wireless device can be successfully substituted for the smart phone 57 to carry out the method/system described herein. For instance, devices such as the iPad™ or iPod Touch™ can also use the short-range wireless protocols to communicate despite not having the capability to communicate via cellular protocols.

The smart phone 57 can include computer processing capability, a transceiver capable of communicating using a short-range wireless protocol, and a visual smart phone display 59. The smart phone display 59 may also include a touch-screen graphical user interface and/or a GPS module capable of receiving GPS satellite signals and generating GPS coordinates based on those signals. In some embodiments, the smart phone 57 can include a downloadable software application (or "app") that can be used to communicate with the vehicle, and in particular, with telematics unit 30 or other vehicle modules. The app provides an interface to the vehicle and may also include navigation features and other additional vehicle services (e.g., vehicle location reporting and vehicle stopping/slowdown control). Smart phone 57 can be carried or operated by any one of a number of individuals. These individuals can include vehicle owners, vehicle occupants, wireless mobile device owners, wireless mobile device users, or others. These users will be interchangeably described in the following descriptions.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit 30 to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module; diagnostic reporting using one or more diagnostic modules; and infotainment-related services where music, webpages, movies, television programs, videogames and/or other information is downloaded by an infotainment module (not shown) and is stored for current or later playback. Vehicle control such as speed control, slowdown, and vehicle ignition enabling and disabling may also be controlled via the telematics unit 30 to provide remote control over vehicle operation. The above-listed services are by no means an exhaustive list of all of the capabilities of telematics unit 30, but are simply an enumeration of some of the services that the telematics unit 30 is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit 30.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, VSM 42 may include: an engine control module (ECM) that controls various aspects of engine operation such as fuel ignition and ignition timing; a stability control module (SCM) configured to continuously monitor steering and vehicle direction; and a sensing and diagnostics module (SDM) configured to monitor and record crash-related data and to control air bag deployment. Other examples of VSMs 42 may be a sensor collecting module, and more particularly, an external object calculation module (EOCM) configured to collect data from various vehicle sensors, and seatbelt, airbag, safety modules (e.g., rollover system, electronic stability control system (ESC), tire pressure monitoring system (TPMS), antilock braking system (ABS), etc.). The vehicle sensors may include, but are not limited to, short range ultrasonic radars, long range ultrasonic radars, and vehicle cameras. The sensor collecting module may also collect data from other vehicle sensors configured to measure time, distance traveled, and steering wheel angle. Yet another example of a VSM 42 is a vehicle crash module such as an advanced automatic crash notification (AACN) system or an emergency notification module, which may be separate modules or part of the telematics unit 30. It is appreciated by those skilled in the art, the above-mentioned VSMs are only examples of some of the modules that may be used in vehicle 12, as numerous others are also possible.

Vehicle electronics 28 also include a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit 30 to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allows manual user input into the telematics unit 30 to initiate wireless telephone calls and provide other data, response, or control input. According to the particular embodiment shown here, audio system 36 is operatively coupled to both vehicle bus 44 and entertainment bus 46 and can provide AM, FM and satellite radio, CD, DVD, and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000), GSM/GPRS, or LTE. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
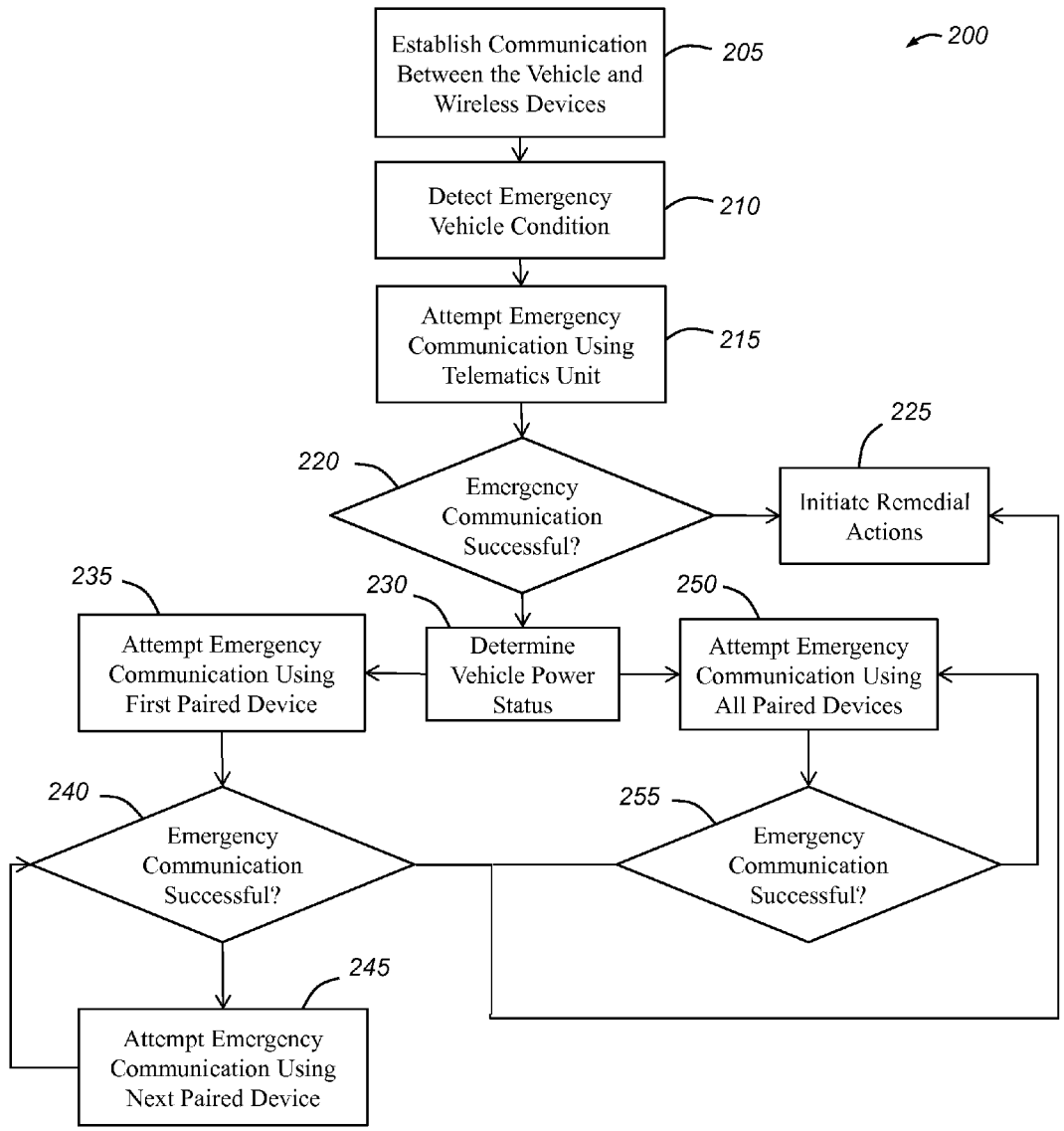
FIG. 2 is a flow chart illustrating an exemplary method for providing emergency services when a vehicle telematics unit is non-functional or otherwise unavailable according to one embodiment of the present invention.

Turning now to FIG. 2, there is a method 200 for providing emergency services when a vehicle telematics unit is non-functional or otherwise not available. For purposes of explanation, certain modules have been selected to implement the method according to FIG. 2, however, one of ordinary skill in the art appreciates that the method described below may be implemented using any combination of the VSMs 42, including the vehicle telematics unit 30.

The method 200 begins at step 205 with establishing secure short-range wireless communication between the telematics unit 30 and one or more nearby wireless mobile devices, thereby linking the wireless device with the vehicle 12. The telematics unit 30 and wireless devices can communicate with each other via any suitable short-range wireless communication technology using a standardized protocol, such as Bluetooth or others, some of which have been listed above. In operation, the telematics unit 30 can broadcast a low-power signal that alerts wireless devices within proximity of the vehicle 12 that it is able to establish a wireless connection. If a device is nearby, such as smart phone 57, the telematics unit 30 can provide the smart phone 57 with a wireless address of the telematics unit 30 and can receive in response a wireless address of the smart phone 57. For example, this can take place when a vehicle owner enters the vehicle 12 while carrying the smart phone 57. In this instance, the telematics unit 30 can be in a standby mode and begin searching for the smart phone 57 after a door of the vehicle 12 is opened. The telematics unit 30 can also search for wireless mobile devices when the vehicle ignition is turned on. Once both the telematics unit 30 and the smart phone 57 can identify each other, a secure wireless connection between them can be established over which the telematics unit 30 and the smart phone 57 can send and receive data. This linking or pairing of the smart phone 57 with the telematics unit 30 can be implemented such that it initially requires operator authorization, after which the pairing can be carried out automatically without user involvement.

In one embodiment, the telematics unit 30 may also be linked or paired to a software application ("app") installed on the smart phone 57. After an initial linking or pairing to the telematics unit 30, the app on the smart phone 57 may automatically communicate with the telematics unit 30 through any suitable wireless communications technology as set forth above, or there may be an authentication mechanism such as requiring a password or other identifying information prior to connection with the telematics unit 30.

The telematics unit 30, and/or another suitable vehicle systems module, maintains a list of possible mobile devices and their corresponding identifying information, which may be stored in, for example, memory 54. The list of mobile devices may also be ranked according to a priority. In one embodiment, the list is prioritized based on the numerical order of the phone numbers (i.e., lowest to highest or vice versa). However, there is generally a primary paired device (i.e., whatever device is currently paired, typically through a Bluetooth connection) that is always ranked first on the list, while the other detected devices are ranked according to their phone number. Other ranking schemes, such as through IP address or other identifying features are also contemplated.

At step 210, an emergency vehicle condition such as a crash and/or a rollover is detected by one of the VSMs 42 as set forth above. Notification is thereafter provided to another VSM 42 such as, for example, an emergency notification module. At step 215, the emergency notification module attempts to initiate an emergency wireless communication about the emergency condition to one or more parties. The emergency wireless communication can be a phone call, a text message, an email, and/or any suitable communication format. It can be one communication (e.g., one phone call, one text message, one email, etc.) or multiple ones such as several phone calls, several text messages, one phone call followed by a text message or email, etc. The content of the emergency wireless communication may be vocal, data communication, or a combination that include a request for help, announcement about the crash, and/or any related information about the crash, the vehicle, and/or occupant(s) of the vehicle. The emergency wireless communication may be sent to an emergency authority, a call center, a contact person related to an occupant of the vehicle, and/or any other parties previously selected by a user of the vehicle.

The first attempt to initiate the emergency communication is through the vehicle telematics unit 30. At step 220, the method determines if the emergency communication was successfully completed. This may be accomplished in any number of ways including, but not limited to, voice recognition, feedback from the call center, and Bluetooth information. If the emergency communication attempt using the telematics unit 30 was successful, at step 225 remedial actions are taken such as, but not limited to, activating a speaker phone in the vehicle, activating GPS for tracking, providing crash and/or accident data if available including severity and type, and the number of occupants in the vehicle.

If the emergency communication attempt using the telematics unit 30 failed, then it can be assumed that the telematics unit 30 non-functional, at least from a cellular capability standpoint, or that the telematics unit 30 is otherwise unavailable, wherein unavailable may include being absent, damaged, and/or non-functional in whole or part. With no telematics unit 30 capability, at step 230 the method determines whether the vehicle power status is above a threshold. In one embodiment, the vehicle power status is inferred by examining the power level of the telematics unit 30. By way of background, the telematics unit 30 has an emergency battery backup that is used under a variety of circumstances, including a vehicle crash. When the battery backup on the telematics unit 30 is being drained and falls below a particular threshold (e.g., 9 V), it is likely that the vehicle battery has been compromised. The battery backup power level may also indicate the amount of time remaining before the battery backup is completely depleted. This information is utilized to determine whether subsequent emergency communication attempts should be made to include one or all available wireless devices.

If the power level of the telematics unit 30 is above the threshold, then at step 235 an emergency communication attempt is made using a wireless device present in the vehicle. To the extent there is more than one wireless device present, the emergency communication attempt is made first with the primary paired wireless device, which in one embodiment, is the first device in the ranked list of paired wireless devices. The emergency communication may be implemented using multiple wireless network interfaces. For example, if the primary default connection being used is Bluetooth and that connection is damaged and incapable of providing a communication link between smart phone and emergency notification module (either directly or indirectly depending on system partition), the smart phone would then be connected to the emergency notification module via Wi-Fi or other wireless protocol to replicate the function provided by a normal Bluetooth communication (e.g., VoIP, call status/confirmation, etc). In the event of multiple wireless networks (Bluetooth, Wi-Fi, etc.), then the first available network would be the default in the event of Bluetooth failure.

At step 240, the method determines if the emergency communication using the first wireless device was successfully completed using the techniques set forth above. If the emergency communication attempt was successful, remedial actions such as those set forth at step 225 are taken. If the emergency communication using the first wireless device failed, at step 245 an emergency communication is attempted using the next wireless device on the list of paired devices. Steps 240 and 245 are repeated until the list is exhausted, or an emergency communication was successful.

Referring back to step 230, if the power level of the telematics unit 30 is below the threshold, then at step 250 an emergency communication attempt is made using all wireless devices present in the vehicle. The low power level indicates that there may not be enough time to cycle through the list of paired devices sequentially so an attempt is made using all of the present devices concurrently. This attempt is made using all possible available connection resources (i.e., Bluetooth, Wi-Fi, mobile device "app", etc.). At step 255, the method determines if the emergency communication using any of the wireless devices was successfully completed. If the emergency communication attempt was successful, remedial actions such as those set forth at step 225 are taken.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A method for providing emergency vehicle services, the method comprising the steps of:
   detecting an emergency condition including a vehicle crash and/or rollover;
   determining if a vehicle telematics unit is available; and
   initiating an emergency communication using one or more wireless devices present in the vehicle if the vehicle telematics unit is not available.

2. The method of claim 1, further comprising the step of detecting wireless devices that are present in the vehicle upon vehicle startup.

3. The method of claim 1, wherein the step of determining if the vehicle telematics unit is available includes attempting to place the emergency communication using the vehicle telematics unit.

4. The method of claim 3, further comprising the step of determining whether the attempt to place the emergency communication using the vehicle telematics unit was successful.

5. The method of claim 1, further comprising the step of comparing a battery power level to a battery threshold if the vehicle telematics unit is not available.

6. The method of claim 5, wherein the battery power level is the battery power level of the vehicle telematics unit.

7. The method of claim 5, wherein the one or more wireless devices are ranked according to a priority, and wherein the emergency communication is initiated sequentially according the priority using the one or more wireless devices if the battery power level is above the battery threshold, and initiating the emergency communication using all of the one or more wireless devices concurrently if the battery power level is below the battery threshold.

8. The method of claim 1, wherein initiating the emergency communication includes contacting an emergency authority, a call center, a contact person related to an occupant of the vehicle, and/or any other parties previously selected by a user of the vehicle.

9. The method of claim 1, wherein the emergency communication is initiated using a software application on the one or more wireless devices.

10. The method of claim 1, wherein the emergency communication is initiated using a Bluetooth connection and/or a Wi-Fi connection between the vehicle and the one or more wireless devices.

11. The method of claim 1, further comprising the step of providing emergency condition data from a vehicle crash module, a safety module, and/or other suitable module to the emergency authority, the call center, the contact person related to an occupant of the vehicle, and/or any other parties previously selected by the user of the vehicle.

12. A method for providing emergency vehicle services for a vehicle, the method comprising the steps of:

receiving notification of an emergency condition including a vehicle crash and/or rollover;

comparing a battery power level to a battery threshold if an emergency communication attempt using a vehicle telematics unit fails; and initiating an emergency communication using one or more wireless devices present in the vehicle, wherein the one or more wireless devices are ranked according to a priority, and wherein the emergency communication is initiated sequentially according the priority using the one or more wireless devices if the battery power level is above the battery threshold, and initiating the emergency communication using all of the one or more wireless devices concurrently if the battery power level is below the battery threshold.

13. The method of claim 12, wherein the emergency communication is attempted sequentially through the ranked wireless devices until the emergency communication is successfully transmitted.

14. The method of claim 12, wherein the battery power level is the battery power level of the vehicle telematics unit.

15. The method of claim 12, wherein initiating the emergency communication includes contacting an emergency authority, a call center, a contact person related to an occupant of the vehicle, and/or any other parties previously selected by a user of the vehicle.

16. The method of claim 12, wherein the emergency communication is initiated using a software application on the one or more wireless devices.

17. The method of claim 12, wherein the emergency communication is initiated using a Bluetooth connection and/or a Wi-Fi connection between the vehicle and the one or more wireless devices.

18. A system for providing emergency vehicle services, the system comprising:

at least one vehicle system module configured to:
  detect an emergency condition including a vehicle crash and/or rollover;
  determine if a vehicle telematics unit is available; and
  initiate an emergency communication using one or more wireless devices present in the vehicle if the vehicle telematics unit is unavailable.

19. The system of claim 18, wherein the one or more wireless devices are ranked according to a priority, and wherein the emergency communication is initiated sequentially according the priority using the one or more wireless devices if a battery power level is above a battery threshold, and initiating the emergency communication using all of the one or more wireless devices concurrently if the battery power level is below the battery threshold.

20. The system of claim 18, wherein the emergency communication is initiated using a software application on the one or more wireless devices, a Bluetooth connection and/or a Wi-Fi connection between the vehicle and the one or more wireless devices.

* * * * *